United States Patent [19]

McClintock

[11] Patent Number: 5,358,643

[45] Date of Patent: Oct. 25, 1994

[54] TREATMENT METHOD FOR REMOVING ARSENIC FROM ARSENIC CONTAMINATED WATER

[76] Inventor: William W. McClintock, 1166 Coppet St., Fairbanks, Ak. 99709-4721

[21] Appl. No.: 193,220

[22] Filed: Feb. 8, 1994

[51] Int. Cl.$^5$ ............................ C02F 1/52; C02F 1/58
[52] U.S. Cl. .................................... 210/709; 210/721; 210/722; 210/724; 210/725; 210/726; 210/727; 210/743; 210/746; 210/911
[58] Field of Search ............... 210/912, 911, 702, 709, 210/721, 722, 724, 746, 743, 739, 725, 726, 727

[56] References Cited

U.S. PATENT DOCUMENTS

| | | | |
|---|---|---|---|
| 4,548,718 | 10/1985 | Muir | 210/724 |
| 4,622,149 | 11/1986 | Devuyst et al. | 210/721 |
| 4,840,735 | 6/1989 | Goodwin | 210/724 |
| 5,024,769 | 6/1991 | Gallup | 210/721 |
| 5,045,214 | 9/1991 | Walker | 210/724 |
| 5,093,007 | 3/1992 | Domuile | 210/724 |
| 5,114,592 | 5/1992 | Schuster | 210/667 |
| 5,137,640 | 8/1992 | Poncha | 210/724 |

OTHER PUBLICATIONS

"The Detoxification of Effluents Containing Arsenic" EPD Congress '90, Teixeira et al., The Minerals, Metals & Materials Society 1990 pp. 198–207.

"Field Evaluation of Arsenic and Selenium Removal by Iron Coprecipitation", Merrill et al., Environmental Progress 6, 2, 82–90 May 1987.

"Arsenic (III) Oxidation & Removal from Drinking Water", Frank & Clifford, R & D Apr. 1986.

*Primary Examiner*—Cynthia L. Nessler
*Attorney, Agent, or Firm*—R. Russel Austin

[57] ABSTRACT

A treatment method for removing arsenic from water includes conditioning the water with one more additives including an iron salt, an acid, and an oxidant until the water contains more ion than arsenic, is acidic, and has an ORP of about plus 600 mV. A reagent is then added to the conditioned water until it becomes basic and the water and additives are then reacted in a reaction chamber wherein iron and arsenic are co-precipitated in the form of iron arsenate and iron hydroxide or iron oxide. Treated water is then separated from the precipitate by settling of filtering.

12 Claims, 2 Drawing Sheets

TREATMENT METHOD FOR REMOVING ARSENIC FROM ARSENIC CONTAMINATED WATER

BACKGROUND OF THE INVENTION

The present invention is directed in general to a water treatment method for removing arsenic from arsenic contaminated water. It is directed in particular to a treatment method wherein arsenic is removed from the contaminated water by co-precipitation with iron.

Water contaminated with arsenic may be encountered in effluent from mining and mineral processing activities, in waste ash from coal fired power plants, in wells in the vicinity of such operations, and in naturally occurring arsenical mineralization. In order to protect the environment against such arsenic contaminated water it is necessary to select arsenic removal treatment methods for effluent from activities producing the contaminated water before it can find its way into groundwater, wells or other water supplies. It is also necessary to select arsenic removal treatment methods for arsenic contaminated water which has already found its way into groundwater, wells or other water supplies.

Removal of arsenic from contaminated water by the methods including addition of an iron salt to the water are not unknown in the prior art. In such methods it is a goal to co-precipitate the iron with arsenic as insoluble precipitates and separate the precipitates from the water. Success of such methods, however, is strongly dependent on the condition of the contaminated water before it is treated. In most cases, the success of a particular method will be adversely influenced if the contaminated water to be treated has been exposed to air. For example, whatever the original state of arsenic in the arsenic contaminated water, through exposure to air it will usually have been converted to arsenious oxide ($AS_2O_3$) or to the arsenite ion $H_2AsO_3-$. In most cases, these would have precipitated as arsenious oxide or as an arsenite of another element, commonly iron or calcium. In a static reaction tank, or in unfiltered water, the arsenite precipitate would be present in the water to be treated.

While the addition of iron, or an oxidant such as chlorine may cause precipitation of an insoluble arsenate for any arsenic ions remaining in solution in the water to be treated, the arsenite precipitates, being partially soluble, would cause arsenic to leach back into the water being treated. This leaching would, at best, unacceptably prolong the arsenic removal process, or leave a less than safe level of arsenic in the treated water. At worst, it may result in sufficient iron depletion in the water being treated to stop the arsenic removal process altogether.

There is clearly a need for an improved arsenic removal treatment method which may be used with arsenic contaminated water from most common sources.

SUMMARY OF THE INVENTION

The present invention is directed to treating arsenic contaminated water to remove arsenic therefrom. The water may be from a variety of different sources including well water, effluent from mining and mineral operations and the like.

The method comprises conditioning the arsenic contaminated water with one or more additives selected from a group including an iron salt, an acid, and an oxidant until the water contains more iron than arsenic, is acidic, and has a positive oxidation/reduction potential (ORP) sufficiently high that essentially all arsenic in the conditioned water is pentavalent (+5).

After conditioning the water, a basic solution is added to the conditioned water to form a reaction mixture which is basic. This basic reaction mixture is reacted for a predetermined time period to produce treated water having an insoluble precipitate therein. The precipitate includes insoluble compounds of iron and arsenic. Following the reaction period, the treated water is separated from the precipitate. At least the conditioning and formation of the reaction mixture, and preferably also the reaction are carried out in a system from which air is excluded.

In one preferred embodiment, the iron salt is $FeSO_4$; the acid is sulfuric acid ($H_2SO_4$); the oxidant is sodium hypochlorite, (NaOCl); and the basic solution includes sodium hydroxide (NaOH) or sodium carbonate ($Na_2CO_3$), preferably NaOH. A preferred initial pH value of the reaction mixture is between about 7.2 and 8.0. A preferred pH value of the conditioned water is between about 6 and 6.6.

The treatment method of the present invention may be used to provide water having an arsenic content as low as 0.001 milligrams per liter (mg/L) which is less than the presently accepted standard of 0.050 mg/L.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

An important principle of the present invention is that before any attempt is made to remove arsenic from arsenic contaminated water by iron co-precipitation, the water to be treated is conditioned, without exposure to air, to satisfy three specific criteria necessary for the co-precipitation to successfully remove the arsenic. The first criterion is that the water contain more iron than arsenic. Preferably, it should contain significantly more iron than arsenic, for example, as much as five hundred times more. This will ensure that sufficient iron is present to precipitate all arsenic. An iron concentration of at least seven parts per million (7 ppm) will satisfy this criterion in a majority of situations. However, an iron concentration greater than about 20 ppm will usually provide for more complete precipitation. The second criterion is that the water should be acidic, i.e., the water should have a pH less than 7.0. This will cause iron existing in the divalent (+2) state to remain in solution and will thus prevent precipitation of iron compounds. The third criterion is that the water should have a positive ORP sufficiently high that any trivalent (+3) arsenic in the water is converted essentially entirely into a pentavalent state. The ORP should be at least +250 millivolts (mV) and preferably is about +600 mV. The second and third criteria ensure that, provided the water is not exposed to air, compounds of arsenic or iron will not be precipitated therefrom the until the state of the conditioned water is altered by a material which is added to form a reaction mixture and initiate co-precipitation therein. These criteria also provide that, once co-precipitation is initiated, co-precipitation will be rapid (a few minutes), and essentially only insoluble compounds of iron and arsenic will be precipitated.

Co-precipitation of iron and arsenic may be initiated from contaminated water satisfying the above described criteria by simply adding a basic solution to raise the pH value of the conditioned water to a value in excess of 7.0, preferably above about 7.2, and thus forming a reaction mixture which is basic. It has been determined that co-precipitation may be completed, and arsenic removed within a time period of as short as five minutes, if the pH of the conditioned water is raised within a few seconds to a value between about 7.2 and 8.0. It is preferable, however not essential, that co-precipitation take place without exposing the water being treated to air.

In a majority of situations, arsenic contaminated water will not be in compliance with one or more of the above discussed criteria, usually as a result of exposure of the contaminated water to air. Accordingly, one or more additives must be introduced into the water to condition the water and bring it into compliance with the criteria before effective co-precipitation removal of arsenic can occur.

Figure 1:
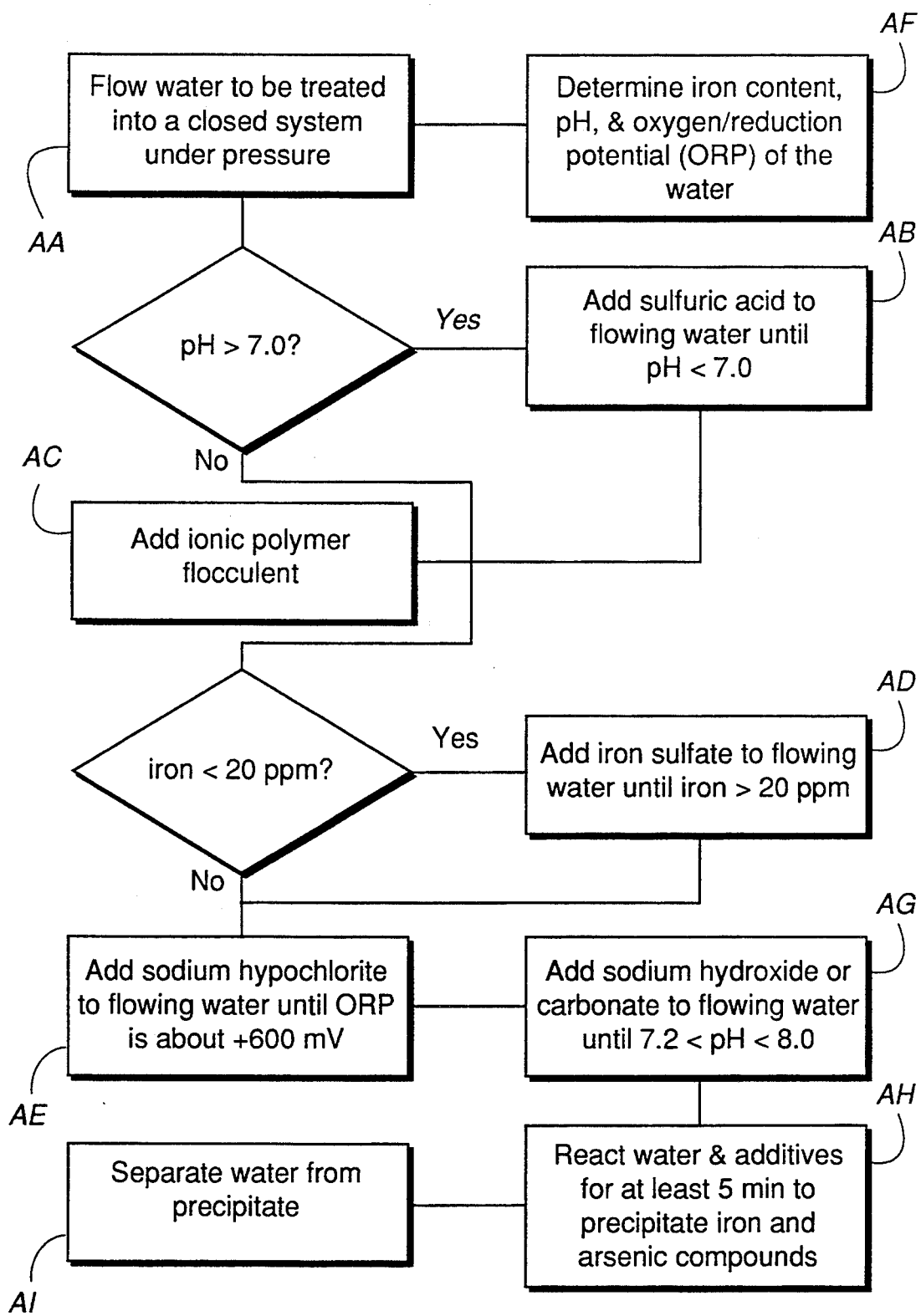
FIG. 1 is a flow chart schematically illustrating one preferred method of a water treatment system in accordance with the present invention.

One preferred embodiment of the treatment method of the present invention is illustrated, in flow chart form, in FIG. 1. Apparatus 10 suitable for carrying on the treatment is illustrated schematically in FIG. 2.

As discussed above, it is important in the method of the present invention that at least the conditioning of the arsenic contaminated water, and preferably the entire treatment, takes place without exposing the water to air during treatment. This prevents unwanted reversal of any conditioning of the contaminated water prior to co-precipitation, and also prevents precipitation of any partially soluble arsenic compounds while co-precipitation is taking place.

Apparatus 10 is thus a closed system from which air is excluded during operation. As such, it is preferably purged with an gas such as argon or nitrogen before any contaminated water is admitted therein for treatment. Apparatus 10 is a continuous flow system, i.e., the system is arranged to operate continuously until it is stopped for cleaning or maintenance, or until all contaminated water being treated has been treated.

Arsenic contaminated water is pumped into the system by a pump 12 supplied by a conduit 14 (FIG. 1 box AA). A coarse filter 16 may be provided for filtering out any suspended solids in the contaminated water. The water flows along main conduit 15 in the direction of arrows A. All solutions added to the arsenic contaminated water for conditioning or treatment thereof are pumped or injected into the conduit.

Apparatus 10 is filled with water being treated during normal operation thereof. Pressure provided by pump 12 maintains the apparatus under positive pressure during operation and thus prevents entry of air.

In a conditioning portion of the system 10A, pumps 18, 20, 22, and 24 provide means for adding, respectively: an acid for reducing pH of the contaminated water (FIG. 1 box AB); an anionic polymer flocculent for promoting co-precipitation (FIG. 1 box AC); an iron salt for increasing iron content of the contaminated water (FIG. 1 box AD); and an oxidant for increasing ORP of the contaminated water (FIG. 1 box AE).

A preferred acid is a forty percent (40%) solution of sulfuric acid ($H_2SO_4$). A preferred anionic polymer flocculent is NALCO 7768 which is available from NALCO Chemical of Chicago, Ill. A preferred ion salt is a 40% solution of iron sulfate ($FeSO_4$). A preferred oxidant is a 33% solution sodium hypochlorite (NaOCl) which is an active constituent of many commercial bleaches. The contaminated water and any additives injected by pumps 18, 20, 22, and 24 are preferably flowed through an in-line mixer 30 to ensure thorough mixing.

Figure 2:
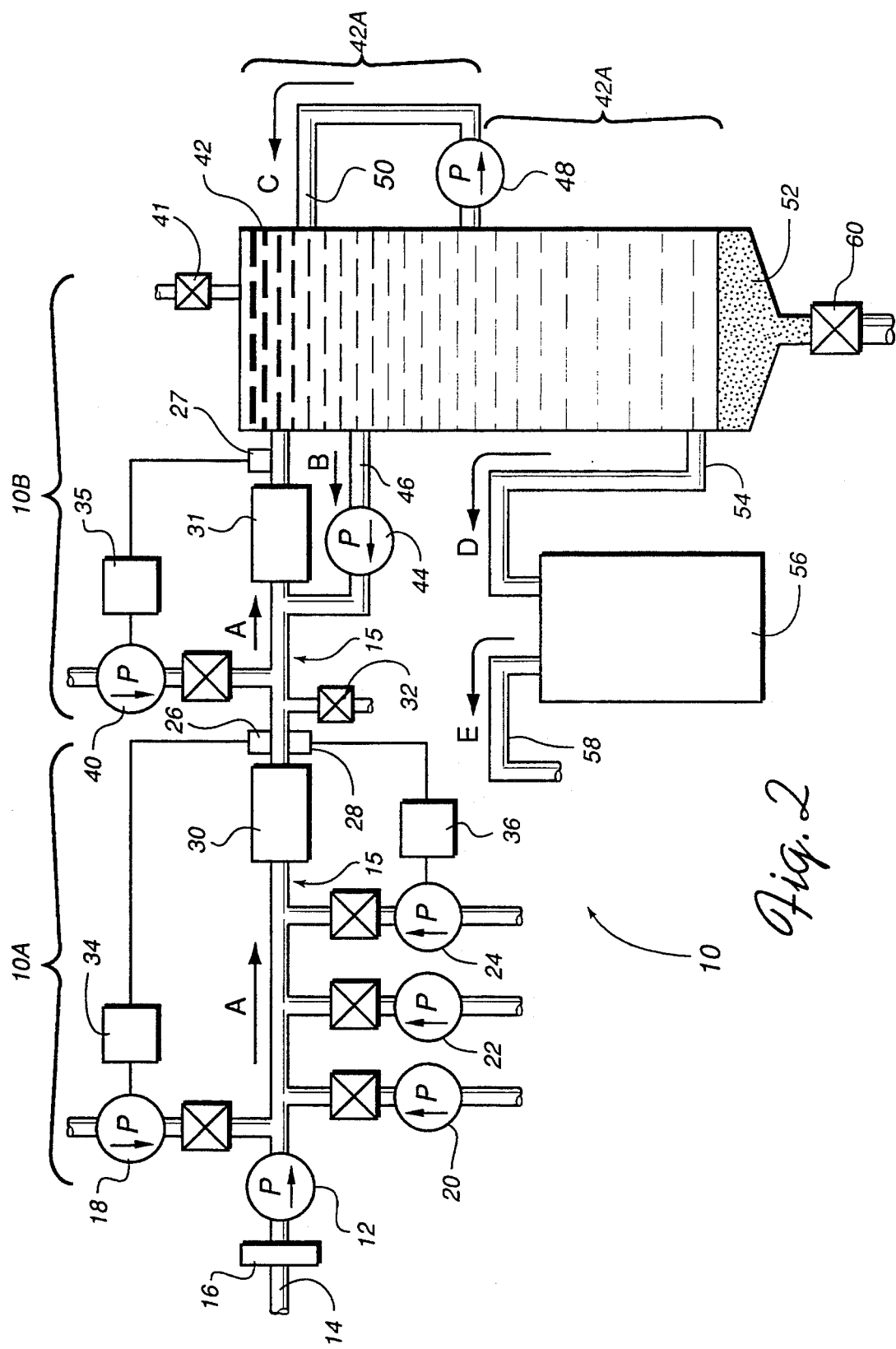
FIG. 2 schematically illustrates one preferred apparatus for carrying out the method of FIG. 1.

Continuing with reference to FIG. 2 and also to box AF of FIG. 1, electrodes or sensors 26 and 28 are provided for electrically measuring, respectively, pH and ORP of water leaving conditioning section 10A of system 10. A pH sensor 27 is also provided in reaction section 10B of system 10. Measurement of pH and ORP may be performed continuously or periodically. Iron content is measured by periodically drawing samples of conditioned water from a valve 32 and chemically analyzing the samples.

An electrical signal from pH sensor 26 is delivered to control circuitry 34 for controlling pump 18. If the pH of water exiting conditioning portion 10A of system 10 is more than about 7.0, pump 18 is activated to add $H_2SO_4$ to water being flowed into system 10 until water exiting conditioning section 10A has a pH less than 7.0. If iron content of water exiting conditioning system 10A is determined to be less than about 20 ppm, pump 22 is activated manually to admit sufficient $FeSO_4$ to raise iron content to greater than 20 ppm. An electrical signal from ORP sensor 28 is delivered to control circuitry 36 for controlling pump 24. If the ORP of water exiting conditioning portion 10A of system 10 is less than a predetermined positive value, pump 24 is activated to sufficient NaOCl to raise the ORP of water exiting conditioning section 10A to a predetermined value, preferably greater than about 250 mV.

A pump 40 is provided for adding a basic solution to conditioned water exiting conditioning section 10 to initiate co-precipitation of arsenic and iron (FIG. 1 box AG). As discussed above, one preferred basic solution is a 40% solution of NaOH. A reaction mixture of conditioned water and basic solution is mixed in an in-line mixer 31. Sensor 27 measures pH of the reaction mixture exiting in-line mixer 31. A signal from sensor 27 is passed to control electronics which control addition of basic solution by pump 40 to maintain pH of the reaction mixture at a predetermined value between about 7.2 and 8.0. Reaction mixture exiting mixer 31 flows into a reaction chamber 42 (FIG. 1 box AH). The chamber is provided with a bleed valve arrangement 41 which allows purging gas to be driven from the tank as it is initially filled. A suitable reaction chamber preferably has a diameter of about 0.8 meters and a height of about 1.52 meters.

The reaction mixture flowing into the reaction chamber is preferably re-circulated by a pump 44 through mixer 31 via a conduit 46 as indicated by arrow B. Re-circulation of reaction mixture within upper portion 42A of reaction chamber 42 is provided for by a pump 48 and a conduit 50. Pump 48 extracts reaction mixture from the reaction chamber at a point thereon between upper portion 42A and lower portion 42B thereof and returns the reaction mixture into upper portion 42A as indicated by arrow C.

Recirculating pumps 44 and 48 are operated such that dwell time of reaction mixture and precipitate formed in the reaction mixture in upper portion 42A of reaction chamber 42 is sufficient to ensure that co-precipitation of arsenic and iron is completed. This dwell time or reaction time should be at least about five minutes. Iron and arsenic will be co-precipitated as iron arsenate, and at least one of iron hydroxide and iron oxide.

In lower portion 42A of the reaction chamber no re-circulation takes place. The majority of any precipitates formed by reaction in upper portion 42B of the reaction chamber settle and accumulate as a layer 52 on the bottom of the chamber. Treated water is separated from the settled precipitate layer 52 by flowing it through a conduit 54 in a direction indicated by arrow D (FIG. 1 box AI). The separated water is then passed through a filter system 56 to remove from the separated, treated water any precipitates which may still be suspended therein. Preferably, filter system 56 is an automatic back-flush filter such as a type 2700 available from Mid-America Water Company, of Niles, Ill. Filtered, treated water exits filter system 46 of apparatus 10 via conduit 58, as indicated by arrow E. Reaction chamber 42 is provided with a drain valve 60 which allows accumulated precipitate 52 to be periodically removed from the treatment apparatus.

An important feature of the treatment method of the present invention is the speed at which necessary reactions occur. By mixing water with conditioning materials, in solution form, in flowing water in main conduit 15, conditioning reactions can be effected very rapidly, for example, in less than about ten seconds. This provides that arsenic contaminated water can be conditioned to prevent any precipitation, and to place arsenic ions in pentavalent form before any counterproductive reactions such as arsenite precipitation can occur. Preventing exposure of the conditioned water to air maintains an optimum conditioned state. Raising the pH of the conditioned water to a level sufficient to initiate rapid co-precipitation of insoluble compounds of iron and arsenic is also accomplished in a less than about ten seconds by adding a basic solution to conditioned water as the water is flowing in main conduit 15.

In effect, all necessary materials to provide the rapid co-precipitation reaction are collected into the conditioned water while the co-precipitation is inhibited by the acid nature of the conditioned water and the exclusion of air. Addition of the basic solution to form the reaction mixture then triggers the desired co-precipitation reaction. The desired co-precipitation reaction, thus initiated, can be essentially completed in about five minutes. This is a sufficiently short time that any undesirable reactions such as formation and subsequent precipitation of arsenites in the (basic) reaction mixture can not occur to a significant extent.

The present invention has been described in terms of a preferred and other embodiments. The invention, however, is not limited to the embodiments described and depicted. Rather, the present invention is limited only by the claims appended hereto.

What is claimed is:

1. A method of treating arsenic contaminated water to remove arsenic therefrom, the method comprising the steps of:
   (a) conditioning the arsenic contaminated water with one or more additives selected from a group including an iron salt, an acid, and an oxidant, until the water contains more iron than arsenic, is acidic, and has a positive ORP sufficiently high that arsenic in the conditioned water will be pentavalent;
   (b) adding a basic solution to the conditioned arsenic contaminated water of step (a) to form a reaction mixture, the reaction mixture being basic;
   (c) reacting the reaction mixture for a predetermined time period to produce treated water having insoluble precipitates therein, the precipitates including compounds of iron and arsenic;
   (d) separating the treated water from the precipitates; and
   wherein at least steps (a) and (b) are executed without exposing the arsenic contaminated water, the conditioned arsenic contaminated water, and the reaction mixture to air.

2. The method of claim 1 wherein steps (a), (b) and (c) are executed without exposing the arsenic contaminated water, the conditioned arsenic contaminated water, and the reaction mixture to air 3. The method of claim 1 wherein the reaction mixture is reacted for at least about five minutes.

4. The method of claim 1 wherein the iron salt is $FeSO_4$.

5. The method of claim 4 wherein the acid is $H_2SO_4$.

6. The method of claim 5 wherein the oxidant is NaOCl.

7. The method of claim 6 wherein the basic solution includes at least one of NaOH and $Na_2CO_3$.

8. The method of claim 7 wherein the conditioned water has an ORP of about 600 millivolts.

9. A method of removing arsenic from arsenic contaminated water, comprising the steps of:
   (a) flowing the arsenic contaminated water under pressure through a closed treatment apparatus, the apparatus including a conditioning section and a reaction section including a reaction chamber, and the apparatus arranged such that water flows through the conditioning section before it flows into the reaction section;
   (b) analyzing the flowing arsenic contaminated water to determine concentration of iron, pH, and ORP;
   (c) if the arsenic contaminated water in the conditioning section has a pH greater than about 7.0, adding sulfuric acid to the arsenic contaminated water until pH is less than about 7.0;
   (d) if iron concentration of the arsenic contaminated water in the conditioning section is less than about 20 ppm, adding iron sulfate solution into the flowing arsenic contaminated water until the iron concentration thereof is greater than about 20 ppm;
   (e) if arsenic contaminated water in the conditioning section has a pH less than about 7.0 and an iron content greater than about 20 ppm adding sodium hypochlorite solution to the arsenic contaminated water until the ORP thereof is about 600 millivolts;
   (f) adding a reagent including at least one of a solution of sodium hydroxide and a solution of sodium carbonate to the arsenic contaminated water exiting the conditioning section until the pH thereof is between about 7.2 and 8.0;
   (g) following step (f), reacting the arsenic contaminated water and the reagent in the reaction chamber to form a precipitate in the treated water, the precipitate including iron in the form of at least one of iron oxide and iron hydroxide, and arsenic in the form of iron arsenate; and wherein at least steps (c)–(f) are executed in the absence of air.

10. The method of claim 9 wherein, in step (f), the arsenic contaminated water and reagent are reacted for at least five minutes.

11. The method of claim 9 further including the step of: (h) adding an ionic polymer flocculent to assist in forming the precipitate.

12. The method of claim 11 further including the step of: (i) separating the treated water from the precipitate.

* * * * *

UNITED STATES PATENT AND TRADEMARK OFFICE
CERTIFICATE OF CORRECTION

PATENT NO.   : 5,358,643
DATED        : Oct. 25, 1994
INVENTOR(S)  : William W. McClintock It is certified that error appears in the above-identified patent and that said Letters Patent is hereby corrected as shown below:

In the Abstract, line 4: delete "ion" and substitute therefor --iron--.

In the Abstract, last line: delete "of" and substitute therefor --or--.

column 3, line 48: delete "an" and substitute therefor --a--.

Signed and Sealed this

Sixteenth Day of May, 1995

Attest:

BRUCE LEHMAN

*Attesting Officer*     *Commissioner of Patents and Trademarks*